US010275388B2

(12) United States Patent
Hanscom et al.

(10) Patent No.: US 10,275,388 B2
(45) Date of Patent: Apr. 30, 2019

(54) SIMULTANEOUS INBOUND MULTI-PACKET PROCESSING

(71) Applicant: International Business Machines Corporation, Armonk, NY (US)

(72) Inventors: Jeffrey C. Hanscom, Poughkeepsie, NY (US); Tynan J. Garrett, Poughkeepsie, NY (US); John M. Pritz, Mercer Island, WA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 299 days.

(21) Appl. No.: 15/275,531

(22) Filed: Sep. 26, 2016

(65) Prior Publication Data
US 2018/0089136 A1    Mar. 29, 2018

(51) Int. Cl.
| G06F 13/00 | (2006.01) |
| G06F 13/42 | (2006.01) |
| G06F 13/40 | (2006.01) |
| H04L 29/06 | (2006.01) |

(52) U.S. Cl.
CPC ...... *G06F 13/4282* (2013.01); *G06F 13/4027* (2013.01); *H04L 69/22* (2013.01)

(58) Field of Classification Search
CPC .......................... G06F 13/4282; G06F 13/4027
See application file for complete search history.

(56) References Cited

U.S. PATENT DOCUMENTS

| 8,018,960 | B2 * | 9/2011 | van der Tuijn | H04L 49/90 370/338 |
| 8,788,732 | B2 * | 7/2014 | Zhu | G06F 9/3851 710/105 |
| 9,753,876 | B1 * | 9/2017 | Hanscom | G06F 13/364 |
| 2009/0006932 | A1 | 1/2009 | Biran et al. | |
| 2010/0262781 | A1 | 10/2010 | Hrusecky et al. | |
| 2012/0254587 | A1 | 10/2012 | Biran et al. | |
| 2015/0161050 | A1 | 6/2015 | Ajanovic et al. | |

OTHER PUBLICATIONS

List of IBM Patents or Patent Applications Treated as Related, May 30, 2017, 2 pages.

(Continued)

*Primary Examiner* — Tammara R Peyton
(74) *Attorney, Agent, or Firm* — Cantor Colburn LLP; Steven Chiu (57) ABSTRACT

A system includes an input/output adapter operable to receive packets in a single clock cycle. The system includes a controller operatively connected to the input/output adapter. The controller is operable to receive a first packet on a first pipeline and a second packet on a second pipeline in a same clock cycle. The controller is further operable to route a header portion of the first packet and a header portion of the second packet on a header path to a header buffer including a plurality of physical arrays in parallel through a header buffer write interface having a single offset address. The controller is operable to route a payload portion of the first packet and a payload portion of the second packet on a data path to a data buffer including a plurality of physical arrays in parallel through a data buffer write interface having a single offset address.

20 Claims, 8 Drawing Sheets

(56) References Cited

OTHER PUBLICATIONS

U.S. Appl. No. 15/594,784, filed May 15, 2017, Entitled: Multi-Packet Processing With Ordering Rule Enforcement, First Named Inventor: Jeffrey C. Hansom.
List of IBM Patents or Patent Applications Treated as Related, Aug. 8, 2017, 2 pages.
U.S. Appl. No. 15/670,221, filed Aug. 7, 2017, Entitled: Multi-Source Data Insertion Using an Elastic Fifo, First Named Inventor: Jeffrey C. Hansom.
List of IBM Patents or Patent Applications Treated as Related, Oct. 20, 2016, 2 pages.
U.S. Appl. No. 15/276,911, filed Sep. 27, 2016, Entitled: Cut-Through Buffer With Variable Frequencies, First Named Inventor: Jeffrey C. Hansom.
U.S. Appl. No. 15/272,858, filed Sep. 22, 2016, Entitled: Multi-Source Data Insertion Using an Elastic Fifo, First Named Inventor: Jeffrey C. Hansom.
U.S. Appl. No. 15/272,974, filed Sep. 22, 2016, Entitled: Processing of Inbound Back-To-Back Completions in a Communication System, First Named Inventor: Jeffrey C. Hansom.
U.S. Appl. No. 15/275,529, filed Sep. 26, 2016, Entitled: Multi-Packet Processing With Ordering Rule Enforcement, First Named Inventor: Jeffrey C. Hansom.

\* cited by examiner

SIMULTANEOUS INBOUND MULTI-PACKET PROCESSING

BACKGROUND

Aspects are related generally to computer-based communication systems, and more specifically to simultaneous inbound multi-packet processing in a computer system.

Peripheral component interconnect express (PCIe) is a component level interconnect standard that defines a bi-directional communication protocol for transactions between input/output (I/O) adapters and host systems. PCIe communications are encapsulated in packets according to the PCIe standard for transmission on a PCIe bus. Packets originating at I/O adapters and ending at host systems are referred to as upbound packets. Packets originating at host systems and terminating at I/O adapters are referred to as downbound packets. PCIe transactions include a request packet and, if required, a completion packet (also referred to herein as a "response packet") in the opposite direction. The PCIe topology is based on point-to-point unidirectional links that are paired (e.g., one upbound link, one downbound link) to form the PCIe bus.

A high-bandwidth PCIe link (×16) can transmit two full transaction layer packets (TLPs) in a single scaled clock cycle and must process two pipelines and two TLPs in a single cycle. Two TLPs can be received in a single cycle, so the path is broken into two separate processing pipelines. Each pipeline has a separate header (16 byte wide) and data (32 byte wide) path. Both pipelines feed the same arrays (shared arrays) with a 32 byte wide data path. There is a need for a way to write two of the same TLP type (e.g., posted/non-posted/completion), 32 bytes per cycle, into the same array. There is also a need to be able to read this data out in the order it was received off the link sequentially. PCIe variations can add further complications, for instance, PCIe flow control is managed in 16 byte increments, not 32 byte increments.

SUMMARY

According to one embodiment, a system includes an input/output adapter operable to receive a plurality of packets in a single clock cycle. The system further includes a controller operatively connected to the input/output adapter. The controller is operable to receive a first packet on a first pipeline and a second packet on a second pipeline in a same clock cycle. The controller is further operable to route a header portion of the first packet and a header portion of the second packet on a header path to a header buffer including a plurality of physical arrays in parallel through a header buffer write interface having a single offset address. The controller is operable to route a payload portion of the first packet and a payload portion of the second packet on a data path to a data buffer including a plurality of physical arrays in parallel through a data buffer write interface having a single offset address.

According to an embodiment, a method includes receiving a first packet on a first pipeline and a second packet on a second pipeline in a same clock cycle at an input/output adapter operatively connected to a controller. The controller routes a header portion of the first packet and a header portion of the second packet on a header path to a header buffer including a plurality of physical arrays in parallel through a header buffer write interface having a single offset address. The controller routes a payload portion of the first packet and a payload portion of the second packet on a data path to a data buffer including a plurality of physical arrays in parallel through a data buffer write interface having a single offset address.

According to an embodiment, a computer program product includes a computer readable storage medium having program instructions embodied therewith. The program instructions are executable by a processing circuit of a controller to cause the processing circuit to perform receiving a first packet on a first pipeline and a second packet on a second pipeline in a same clock cycle at an input/output adapter operatively connected to the controller. The controller routes a header portion of the first packet and a header portion of the second packet on a header path to a header buffer including a plurality of physical arrays in parallel through a header buffer write interface having a single offset address. The controller routes a payload portion of the first packet and a payload portion of the second packet on a data path to a data buffer including a plurality of physical arrays in parallel through a data buffer write interface having a single offset address.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Embodiments provide simultaneous inbound multi-packet processing in a computer system. Rather than reserving additional data buffers to handle collisions between simultaneously received transaction layer packets (TLPs) as a backup array, embodiments break a logical array into separately controllable physical arrays with corresponding array addressing and enablement. Embodiments separately buffer header and payload data with corresponding interface widths and storage capacity to match needed path widths.

Figure 1:
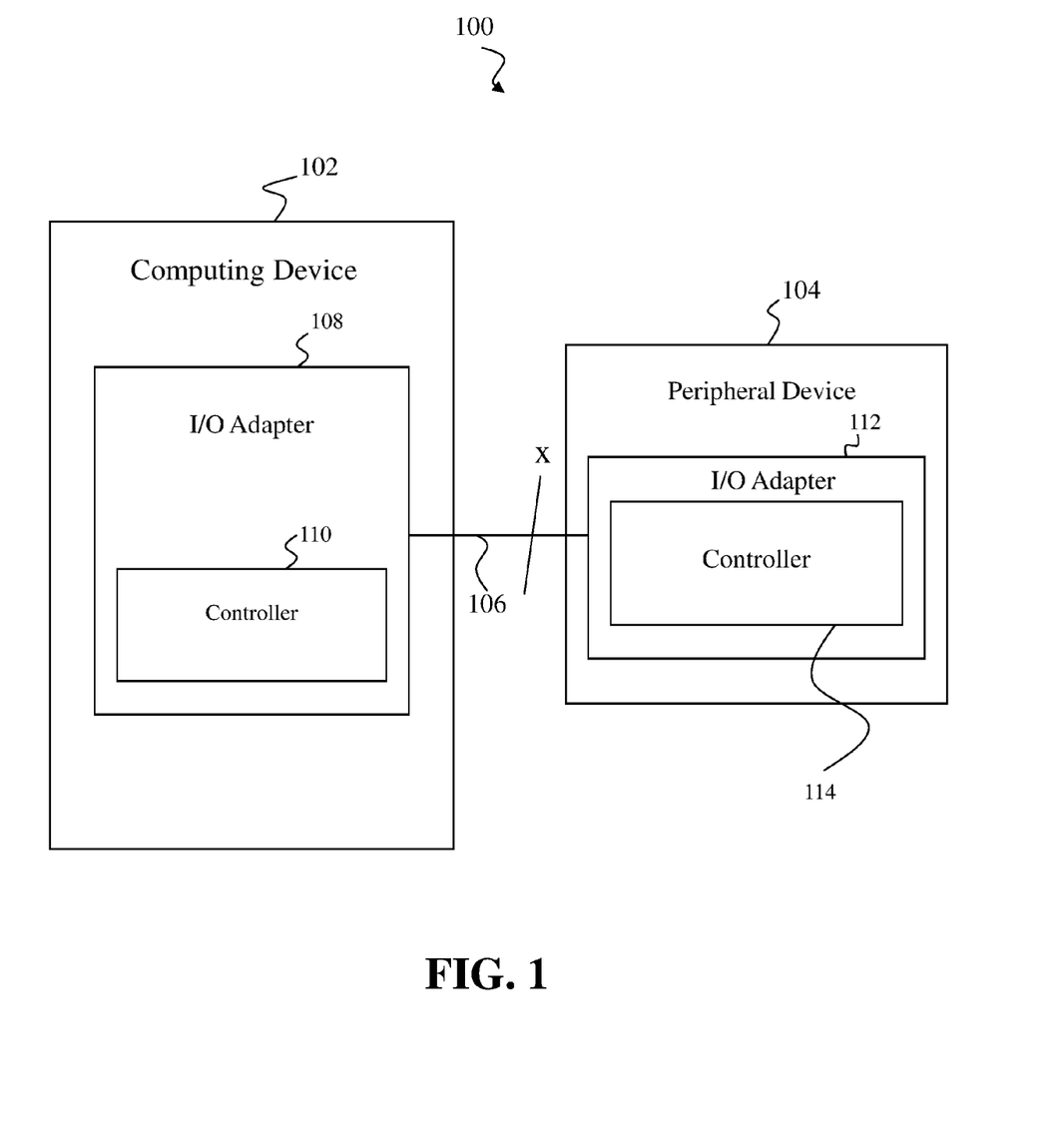
FIG. 1 illustrates a system in accordance with an embodiment.

FIG. 1 illustrates a system 100 on which embodiments may operate. The system 100 includes a computing device 102 and a peripheral device 104. The computing device 102 may be any type of computing device, such as, for example, a personal computer or a server. The computing device 102 performs operations and generates commands and data for transmission to the peripheral device 104. The computing device 102 may be referred to herein as a "root" or a "root complex". The peripheral device 104 may be any type of device capable of receiving commands and data from the computing device 102. For example, the peripheral device 104 may be a monitor, printer, memory unit, or the like.

The computing device 102 and the peripheral device 104 are coupled to one another by a communications link 106. In one embodiment, the communications link 106 may be a PCI Express link. As discussed, a PCI Express link (or bus) is built around pairs of serial (1-bit), unidirectional point-to-point connections also known as "lanes". The number of lanes can be variable and is indicated by the "x" related to the communications link 106.

In more detail, the computing device 102 may include an input/output (I/O) adapter 108 that allows for the physical connection to the communications link 106. The I/O adapter 108 may be operatively connected to a controller 110. In general, the controller 110 serves to control the operation of the I/O adapter 108. The controller 110 can be integrally formed or separate from the I/O adapter 108. In more detail, the controller 110 controls the creation, transmission, and reception of data packets transferred between the computing device 102 and the peripheral device 104 over the communications link 106. The controller 110 may also handle the creation and transmission of flow control credits and transaction layer packets, among other things. In embodiments, the I/O adapter 108 can be a PCIe adapter. The controller 110 may include one or more processing circuits that can be configured to execute processes as further described herein based on program instructions that establish configuration, layout, timing, and/or other functional characteristics of the controller 110 as parallel and/or sequential operations.

The peripheral device 104 may also include an I/O adapter 112 and a controller 114. The I/O adapter 112 may be operatively connected to the controller 114 of the peripheral device 104. In general, the controller 114 serves to control the operation of the I/O adapter 112. The controller 114 can be integrally formed or separate from the I/O adapter 112. In more detail, the controller 114 controls the creation, transmission, and reception of data packets transferred between the peripheral device 104 and the computing device 102 over the communications link 106. The controller 114 may also handle the creation and transmission of flow control credits and transaction layer packets, among other things. In embodiments, the I/O adapter 112 can be a PCIe adapter. The controller 114 may include one or more processing circuits that can be configured to execute processes as further described herein based on program instructions that establish configuration, layout, timing, and/or other functional characteristics of the controller 114 as parallel and/or sequential operations.

Figure 2:
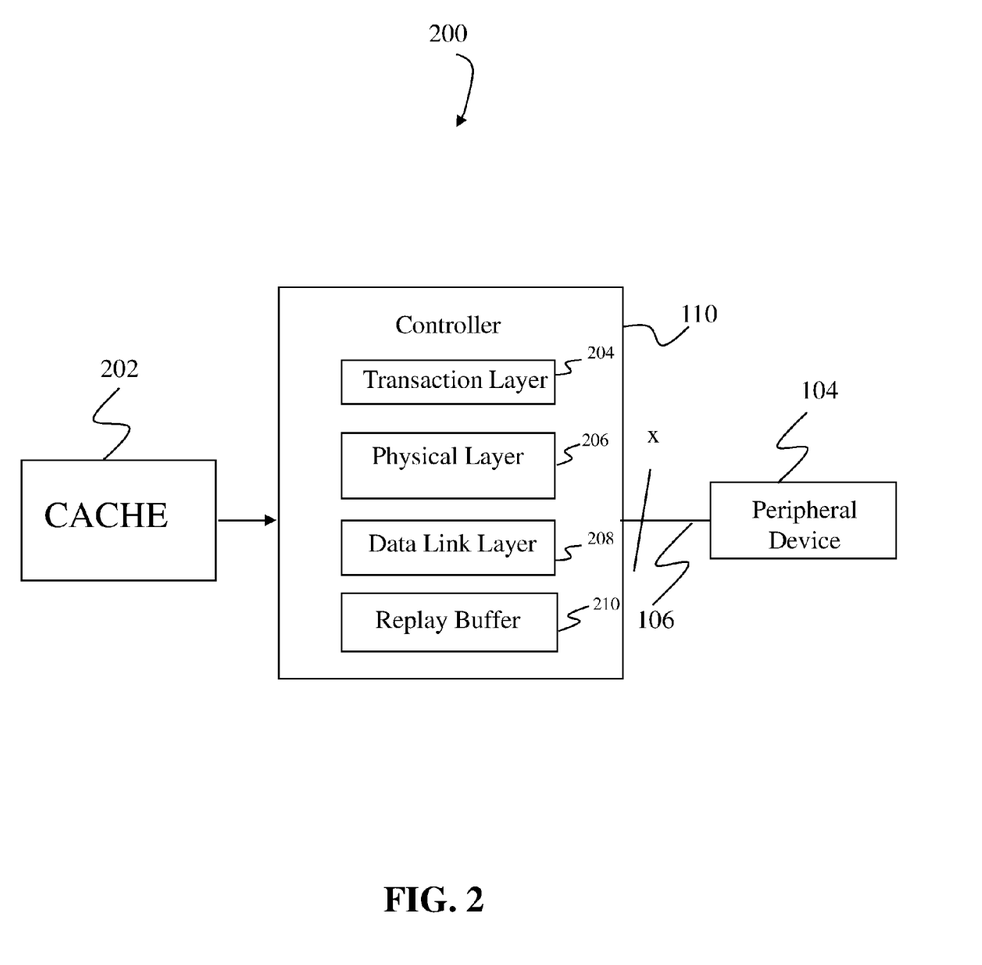
FIG. 2 illustrates a more detailed depiction of a portion of the system shown in FIG. 1 in accordance with an embodiment.

FIG. 2 depicts a block diagram of a portion of the system 100 shown in FIG. 1 in more detail as system 200. In particular, the system 200 includes a cache 202 coupled to controller 110. Information and commands to be transferred from the computing device 102 (FIG. 1) can be stored in the cache 202. The controller 110 handles the transmission of information to the peripheral device 104 via the communications link 106.

The controller 110 can implement, among other things, the PCI Express protocol. In addition, the controller 110 is configured to implement some or all of the aspects of embodiments.

The PCI Express protocol defines a transaction layer 204, a data link layer 208, and a physical layer 206. These layers 204-208 may also be present in the peripheral device 104. As shown, the controller 110 also includes a replay buffer 210. In general, the replay buffer 210 stores packets that have been sent by the controller 110 to the peripheral device 104 until the peripheral device 104 acknowledges receipt of the packets with a defined "ACK" indicator. In the event that a receipt is not acknowledged, one or more packets can be resent from the replay buffer 210.

The transaction layer 204 assembles packets of transaction requests, such as reads and writes, from the computing device 102 (FIG. 1). In common usage these requests may be said to be received from the "core". Header information is added to the transaction requests, to produce transaction layer packets (TLPs). The data link layer 208 applies a data protection code, such as a cyclic redundancy check (CRC), and assigns a sequence number to each TLP. At the physical layer 206, the TLP is framed and converted to a serialized format, then is transmitted across the communications link 106 at a frequency and width compatible with the peripheral device 104.

At the peripheral device 104, the process is reversed. The physical layer converts the serialized data back into packet form, and stores the extracted TLP in memory at the data link layer. The data link layer verifies the integrity of the received TLP, such as by performing a CRC check of the packet, and also confirms the sequence number of the packet. After both checks are performed, the TLP, excluding the sequence number and the data link layer CRC, is forwarded to the transaction layer. The transaction layer disassembles the packet into information (e.g., read or write requests) that is deliverable to the device core. The transaction layer also detects unsupported TLPs and may perform its own data integrity check. If the packet transmission fails, the data link layer requests retransmission of the TLP from the replay buffer 210, known as a link layer retry (LLR).

Figure 3:
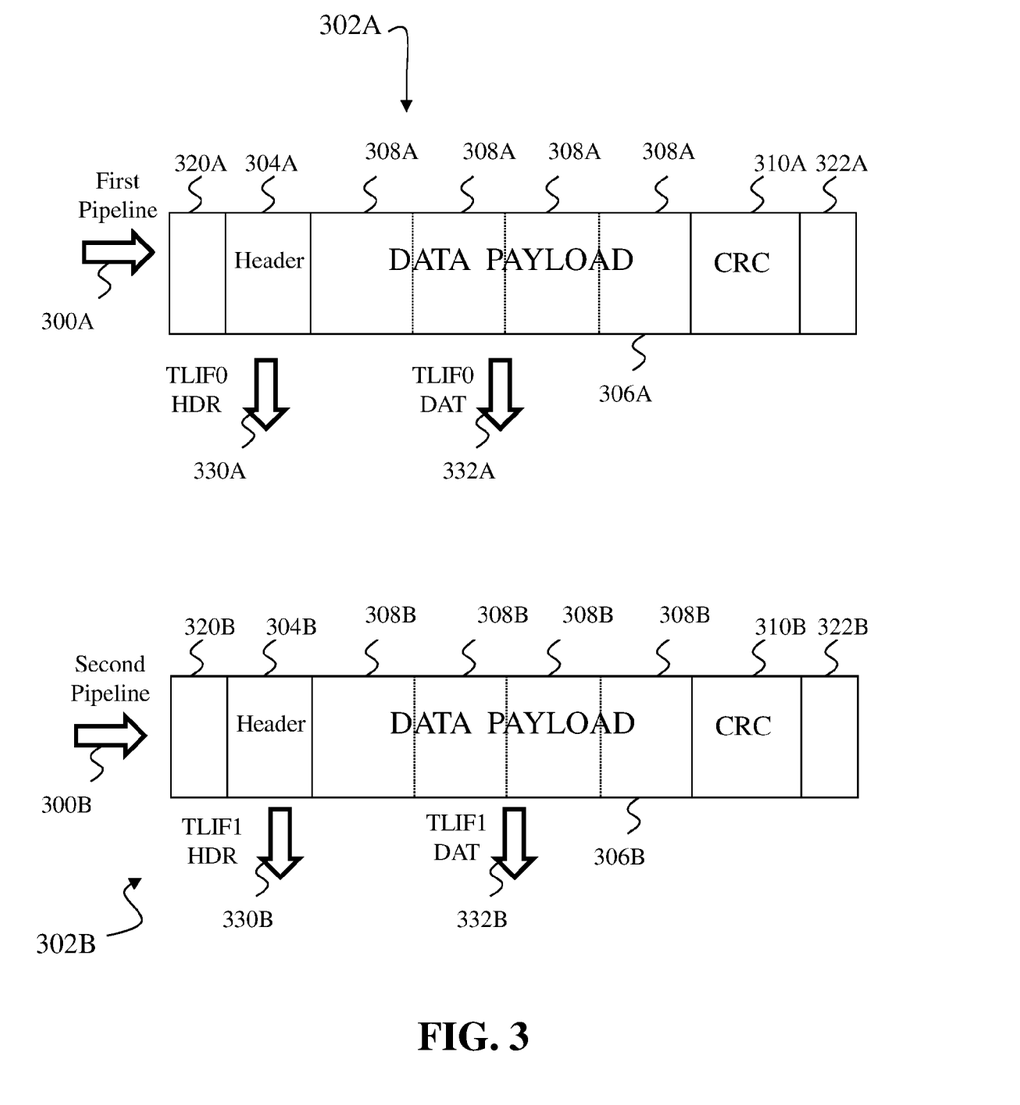
FIG. 3 illustrates a pair of packets received and processed in accordance with an embodiment.

FIG. 3 illustrates a pair of packets received and processed in accordance with an embodiment. A first packet 302A can be received on a first pipeline 300A, and a second packet 302B can be received on a second pipeline 300B in a same clock cycle. The first packet 302A can include a header portion 304A, a payload portion 306A, and cyclical redundancy check (CRC) portion 310A used for error detection and correction. The first packet 302A may also include framing symbols marking the beginning 320A and the end 322A of the first packet 302A. Similarly, the second packet 302B can include a header portion 304B, a payload portion 306B, and CRC portion 310B used for error detection and correction. The second packet 302B may also include framing symbols marking the beginning 320B and the end 322B of the second packet 302B.

Each of the payload portions 306A and 306B can be divided by multiple boundaries 308A and 308B respectively. Each boundary 308A, 308B can be a fixed distance from its nearest neighbor. In one embodiment, the distance between each boundary 308A, 308B is the width of the interface supplying the data.

Figure 4:
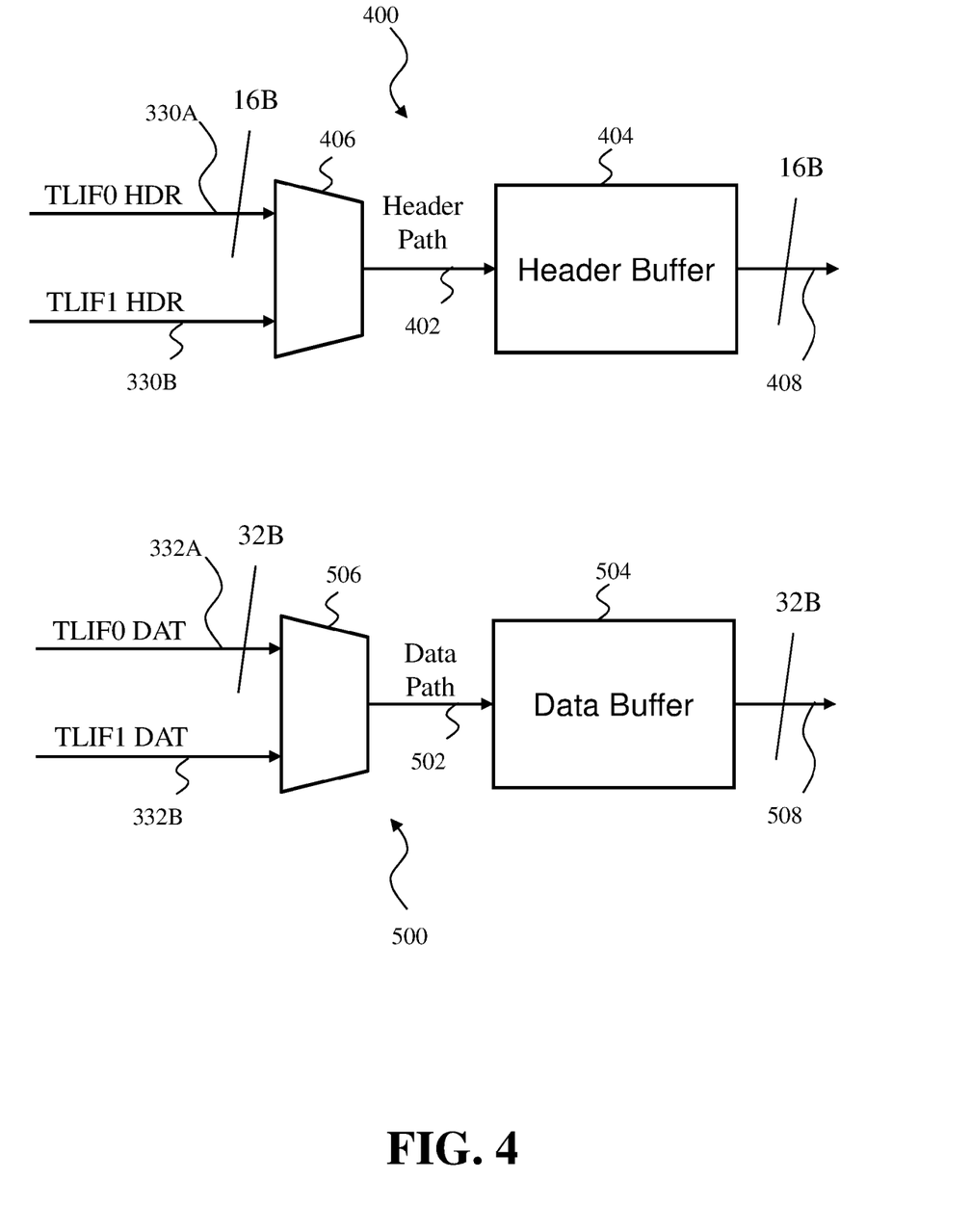
FIG. 4 illustrates transaction layer packet receiver interfaces in accordance with an embodiment.

With reference to FIGS. 3 and 4, the header portion 304A of the first packet 302A can be routed through a transaction layer interface 330A on a header path 402 to a header buffer 404 of a transaction layer packet receiver interface 400. The header portion 304B of the second packet 302B can also be routed through a transaction layer interface 330B on the header path 402 to the header buffer 404 of the transaction layer packet receiver interface 400. A multiplexer 406 can control input selection between the transaction layer interface 330A and the transaction layer interface 330B on the header path 402. The transaction layer interface 330A and the transaction layer interface 330B may each be a 16 byte wide bus. A header buffer read interface 408 of the header buffer 404 can be a 16 byte wide read bus with a 16 byte address offset.

The payload portion 306A of the first packet 302A can be routed through a transaction layer interface 332A on a data path 502 to a data buffer 504 of a transaction layer packet receiver interface 500. The data portion 306B of the second packet 302B can also be routed through a transaction layer interface 332B on the data path 502 to the data buffer 504 of the transaction layer packet receiver interface 500. A multiplexer 506 can control input selection between the transaction layer interface 332A and the transaction layer interface 332B on the data path 502. The transaction layer interface 332A and the transaction layer interface 332B may each be a 32 byte wide bus. A data buffer read interface 508 of the data buffer 504 can be a 32 byte wide read bus with a 16 byte address offset.

Figure 5:
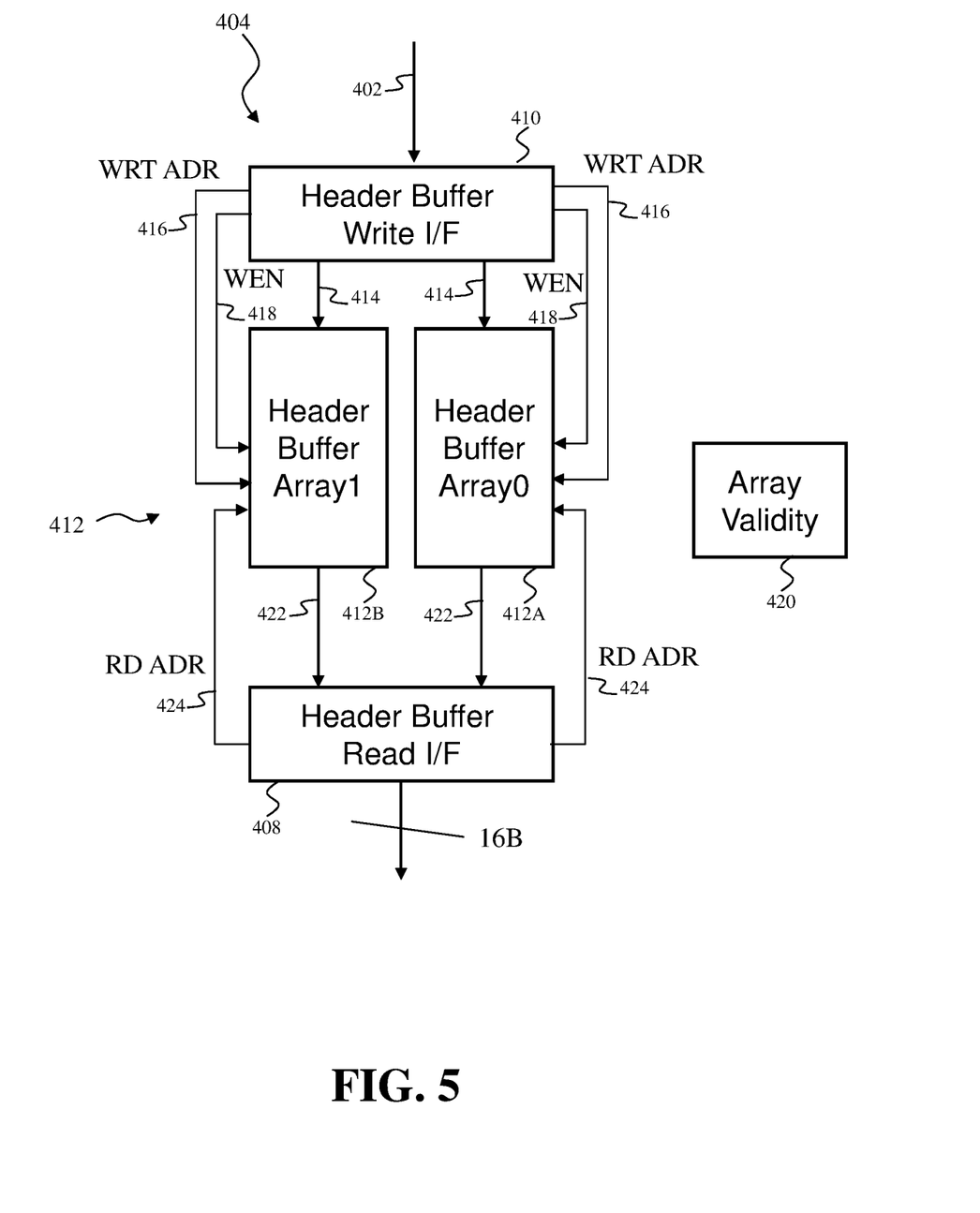
FIG. 5 illustrates a header buffer in accordance with an embodiment.

FIG. 5 illustrates the header buffer 404 in accordance with an embodiment. Control actions for the header buffer 404 are described in reference to controller 110 of FIGS. 1 and 2; however, it will be understood that similar actions can be performed by the controller 114 of FIG. 1. A header buffer write interface 410 can include a 16 byte wide bus using a single offset address that has a 16 byte offset address with a write enable. The header buffer 404 can include a plurality of physical arrays 412 in parallel, such as header buffer array 412A and 412B. The header buffer arrays 412A, 412B may each be 16-byte wide temporary storage elements. As packets 302A, 302B are received, the corresponding header portions 304A, 304B can be sequentially written through the header buffer write interface 410 to the header buffer array 412A and 412B as parallel slices on bus 414 as addressed by address bus 416 and write enable 418. The write enable 418 can be used in combination with a single 16 byte offset address on address bus 416 to alternate access between the header buffer array 412A and 412B. For example, if back-to-back instances of the first packet 302A of FIG. 3 are received, instances of the header portion 304A can be sequentially written to each header buffer array 412A and 412B in the order received. If the first packet 302A and the second packet 302B of FIG. 3 are received in the same clock cycle, the header portion 304A of the first packet 302A and the header portion 304B of the second packet 302B can be written in parallel to the header buffer array 412A and 412B using 16 byte offset addressing. Further, rather than managing validity tracking on an entry basis, embodiments, can track validity on an array basis for the physical arrays 412 of the header buffer 404, for instance, using array validity 420.

A header buffer 404 entry of array validity 420 can indicate that an entire TLP (including header and data payload portions) is valid and ready to be read out of the arrays 412 and 512 (FIG. 5). Header array validity can be indicated by passing an updated write address to read control logic. The arrays 412 can be implemented as first-in-first-out (FIFO) arrays, so an increment to the write address indicates a new entry has been written. Also note that array validity 420 can be used to control a PCIe flow control credit return. When an entry is validated, it has consumed a PCIe flow control credit. When invalidated, the PCIe flow control credit is returned.

The controller 110 is operable to read from the header buffer 404 through the header buffer read interface 408 that can include a 16 byte wide read bus with a 16 byte address offset. The header buffer read interface 408 can access parallel slices of the header buffer array 412A and 412B on bus 422 as addressed by address bus 424. In some embodiments, the buses 414 and 422 include one or more of the same bus segments depending on sizing and timing constraints. Similarly, address buses 416 and 424 can include one or more of the same bus segments depending on sizing and timing constraints. In some embodiments, the write enable 418 can be used as a read enable or an alternate enable can be incorporated.

Figure 6:
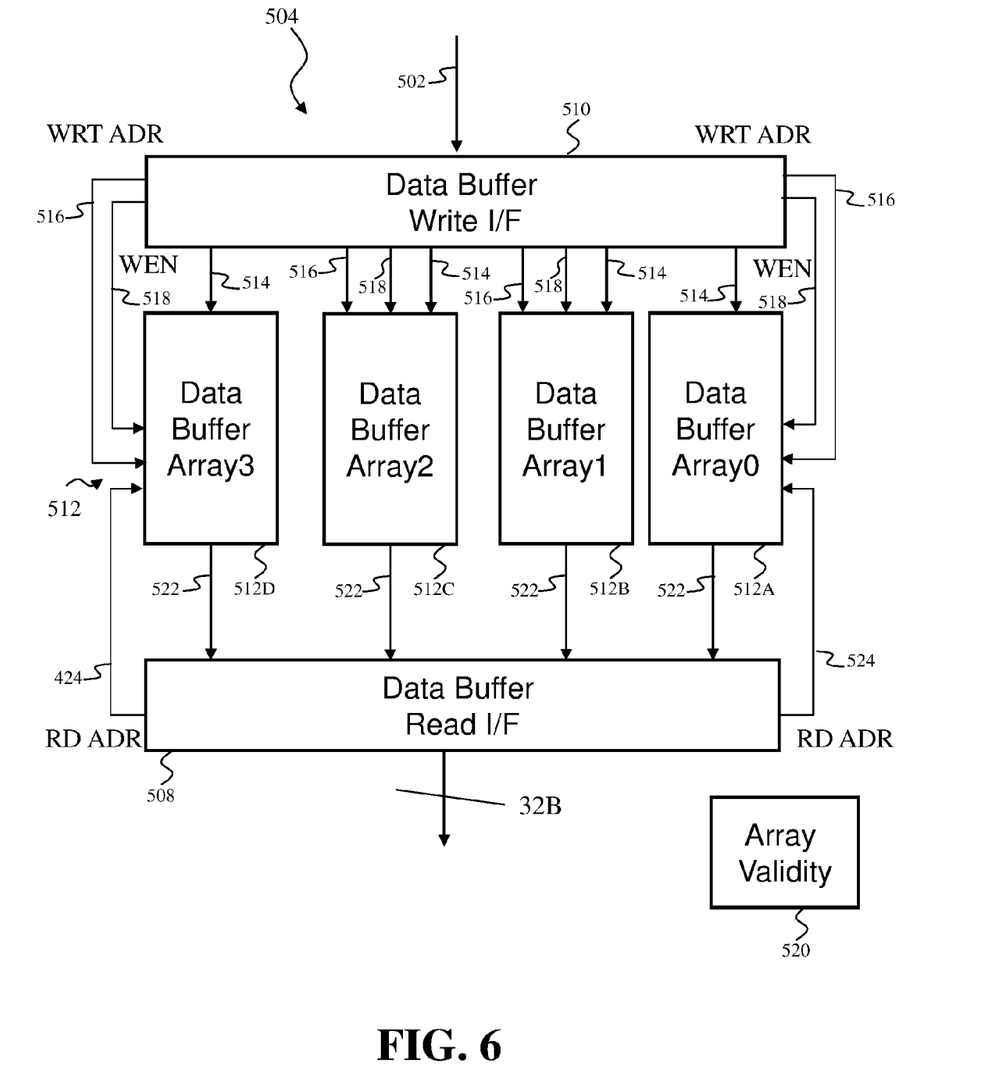
FIG. 6 illustrates a data buffer in accordance with an embodiment.

FIG. 6 illustrates the data buffer 504 in accordance with an embodiment. Control actions for the data buffer 504 are described in reference to controller 110 of FIGS. 1 and 2; however, it will be understood that similar actions can be performed by the controller 114 of FIG. 1. A data buffer write interface 510 can include a 32 byte wide bus using a single offset address that has a 16 byte offset address with a write enable. The data buffer 504 can include a plurality of physical arrays 512 in parallel, such as data buffer array 512A, 512B, 512C and 512D. The data buffer arrays 512A-512D may each be 16-byte wide temporary storage elements. As packets 302A, 302B are received, the corresponding payload portions 306A, 306B can be sequentially written through the data buffer write interface 510 to the data buffer array 512A-512D as parallel slices on bus 514 as addressed by address bus 516 and write enable 518. The write enable 518 can be used in combination with a single 16 byte offset address on address bus 516 to alternate access between the data buffer array 512A-512D. For example, if back-to-back instances of the first packet 302A of FIG. 3 are received, instances of the payload portion 306A can be sequentially written to the data buffer array 512A-512D in the order received. If the first packet 302A and the second packet 302B of FIG. 3 are received in the same clock cycle, the payload portion 306A of the first packet 302A and the payload portion 306B of the second packet 302B can be written in parallel to the payload buffer array 512A-512D using 16 byte offset addressing. The write enable 518 can include 2-bits, where each bit is associated with a 16 byte half of the 32 byte wide bus. Further, rather than managing validity tracking on an entry basis, embodiments, can track validity on an array basis for the physical arrays 512 of the data buffer 504, for instance, using array validity 520.

Similar to the array validity 420 of FIG. 5, the array validity 520 can be used to control a PCIe flow control credit return. When an entry is validated, it has consumed a PCIe flow control credit. When invalidated, the PCIe flow control credit is returned. One data flow control credit can be 16 bytes, which is one reason that the arrays 512 are managed in 16 byte increments even though the data is flowing in at 32 bytes per cycle ending on any 4 byte boundary. The 16 byte flow control credit is one reason that the data buffer 504 is 16 byte addressable on both data buffer read and write interfaces 508, 510. Inbound data of multiple TLPs can be packed gapless in the data buffer 504 in view of the 16 byte flow control credit and the 16 byte increment addressing. In contrast, the header buffer 404 of FIG. 5 is logically 16 bytes wide, because the maximum header size is 16 bytes. Two 16 byte header buffer arrays 412A, 412B of FIG. 5 can be "striped" so that two headers can be written in a cycle, since headers may arrive that quickly off a PCIe bus, such as the communications link 106.

The controller 110 can assign the 16 byte address offset per pipeline 300A, 300B with gapless 16 byte offset assignments. In embodiments, the controller 110 is operable to read from the data buffer 504 through the data buffer read interface 508 that can include a 32 byte wide read bus with a 16 byte address offset. The data buffer read interface 508 can access parallel slices of the data buffer array 512A and 512B on bus 522 as addressed by address bus 524. The controller 110 is operable to wrap addresses targeting 16 byte wide or 32 byte wide reads through the data buffer read interface 508. In some embodiments, the buses 514 and 522 include one or more of the same bus segments depending on sizing and timing constraints. Similarly, address buses 516 and 524 can include one or more of the same bus segments depending on sizing and timing constraints. In some embodiments, the write enable 518 can be used as a read enable or an alternate enable can be incorporated.

Figure 7:
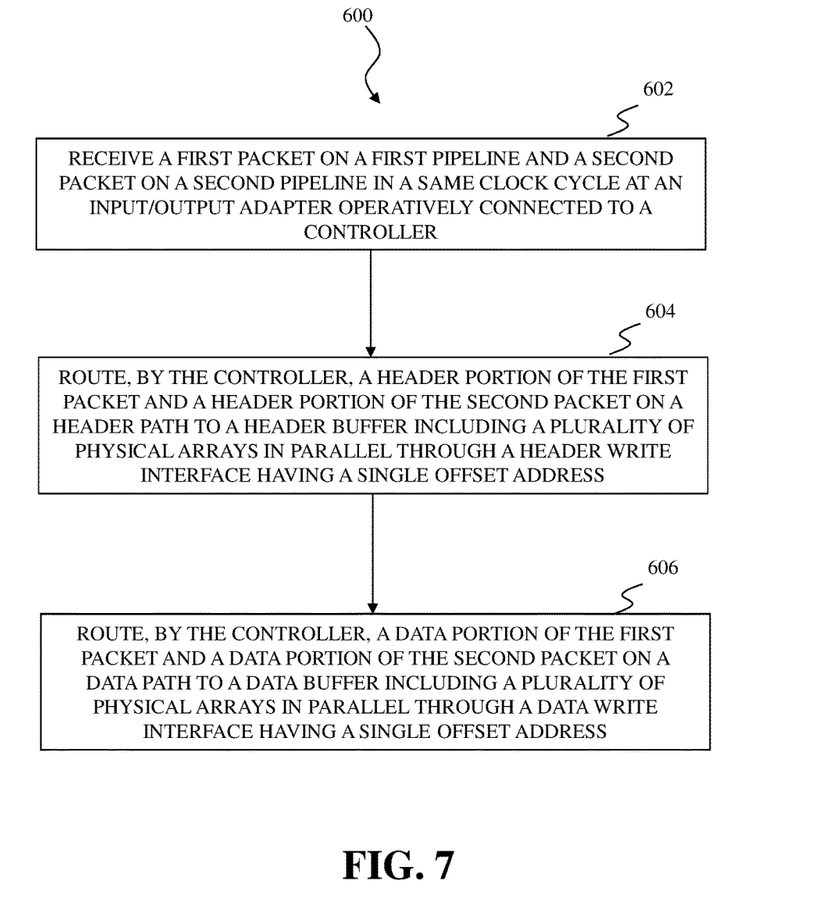
FIG. 7 illustrates a process flow in accordance with an embodiment.

Turning now to FIG. 7, a flow diagram of a process 600 is generally shown in accordance with an embodiment. The process 600 is described with reference to FIGS. 1-6 and may include additional steps beyond those depicted in FIG. 7.

At block 602, a first packet 302A is received on a first pipeline 300A and a second packet 302B is received on a second pipeline 300B in a same clock cycle at an I/O adapter 108 operatively connected to a controller 110. The I/O adapter 108 can be a PCIe adapter.

At block 604, the controller 110 routes a header portion 304A of the first packet 302A and a header portion 304B of the second packet 302B on a header path 402 to a header buffer 404 including a plurality of physical arrays 412 in parallel through a header buffer write interface 410 having a single offset address. The header buffer write interface 410 can include a 16 byte wide bus, and the single offset address can be a 16 byte offset address with a write enable 418. The header buffer 404 can be read through a header buffer read interface 408 including a 16 byte wide read bus with a 16 byte address offset.

At block 606, the controller 110 routes a payload portion 306A of the first packet 302A and a payload portion 306B of the second packet 302B on a data path 502 to a data buffer 504 including a plurality of physical arrays 512 in parallel through a data buffer write interface 510 having a single offset address. Validity can be tracked on an array basis for the physical arrays 412 of the header buffer 404 and the physical arrays 512 of the data buffer 504. The data buffer write interface 510 can include a 32 byte wide bus, and the single offset address can be a 16 byte offset address with a 2-bit write enable 518. The controller 110 can read from the data buffer 504 through a data buffer read interface 508 including a 32 byte wide read bus with a 16 byte address offset. The controller 110 can wrap addresses targeting 16 byte wide or 32 byte wide reads through the data buffer read interface 508. Each bit of the 2-bit write enable 518 can be associated with a 16 byte half of the 32 byte wide bus. The controller 110 can assign the 16 byte address offset per pipeline 300A, 300B with gapless 16 byte offset assignments.

Figure 8:
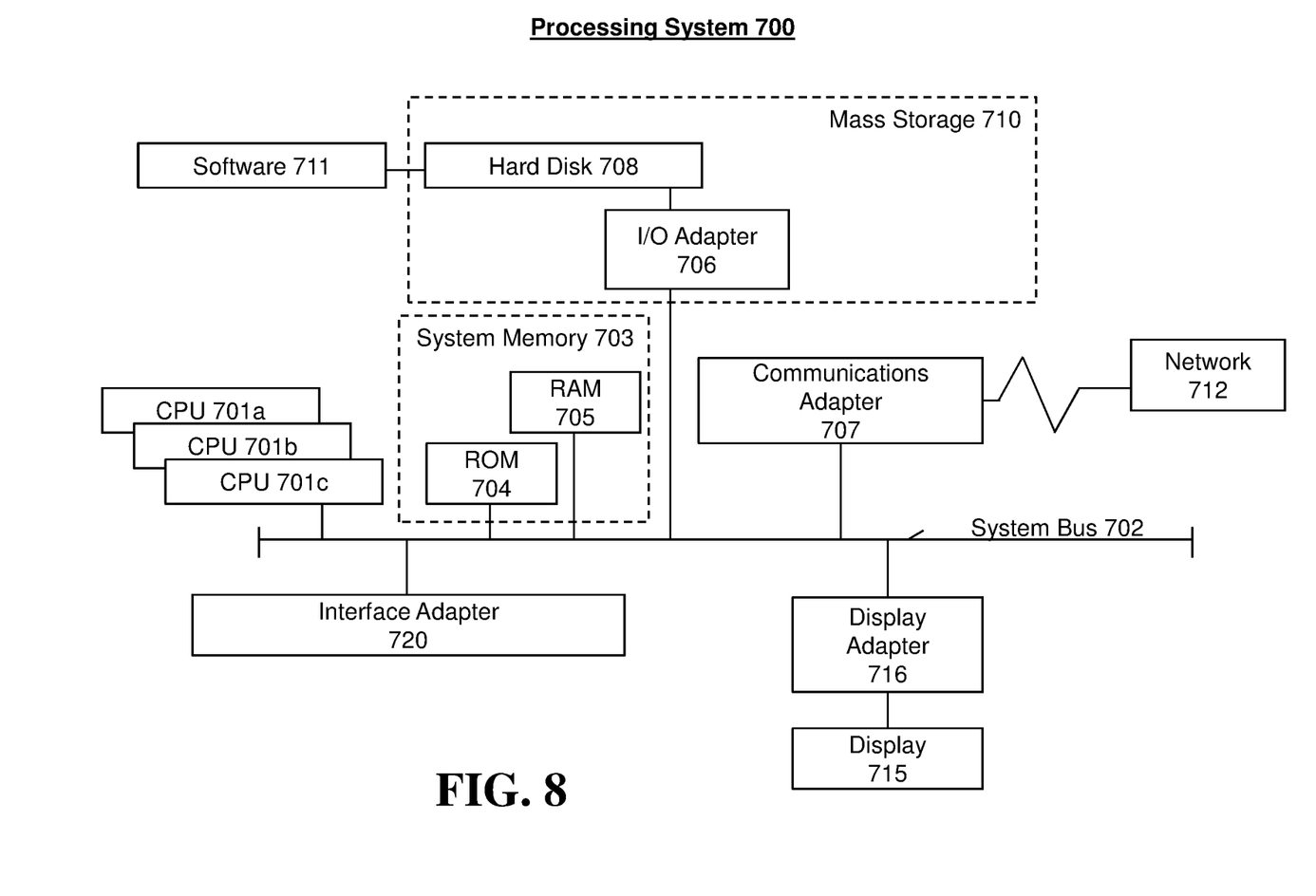
FIG. 8 illustrates a processing system in accordance with an embodiment.

Referring now to FIG. 8, there is shown an embodiment of a processing system 700 for implementing the teachings herein. In this embodiment, the processing system 700 has one or more central processing units (processors) 701a, 701b, 701c, etc. (collectively or generically referred to as processor(s) 701). The processors 701 can be an embodiment of the computing device 102 of FIG. 1. The processors 701, also referred to as processing circuits, are coupled via a system bus 702 to a system memory 703 and various other components. The system memory 703 can include read only memory (ROM) 704 and random access memory (RAM) 705. The ROM 704 is coupled to system bus 702 and may include a basic input/output system (BIOS), which controls certain basic functions of the processing system 700. RAM 705 is read-write memory coupled to system bus 702 for use by the processors 701.

FIG. 8 further depicts an input/output (I/O) adapter 706 and a communications adapter 707 coupled to the system bus 702. I/O adapter 706 may be a small computer system interface (SCSI) adapter that communicates with a hard disk 708 and/or any other similar component. I/O adapter 706 and hard disk 708 are collectively referred to herein as mass storage 710. Alternatively, the I/O adapter 706 and/or the communications adapter 707 can be embodiments of the I/O adapter 108 or I/O adapter 112. Software 711 for execution on the processing system 700 may be stored in mass storage 710. The mass storage 710 is an example of a tangible storage medium readable by the processors 701, where the software 711 is stored as instructions for execution by the processors 701 to perform a method, such as the process flow 600 of FIG. 7. Communications adapter 707 interconnects the system bus 702 with an outside network 712 enabling processing system 700 to communicate with other such systems. A display 715 is connected to system bus 702 via a display adapter 716, which may include a graphics controller to improve the performance of graphics intensive applications and a video controller. In one embodiment, adapters 706, 707, and 716 may be connected to one or more I/O buses that are connected to the system bus 702 via an intermediate bus bridge (not shown). Suitable I/O buses for connecting peripheral devices such as hard disk controllers, network adapters, and graphics adapters typically include protocols, such as PCIe. Additional input/output devices can be connected to the system bus 702 via an interface adapter 720 and the display adapter 716. A keyboard, mouse, speaker can be interconnected to the system bus 702 via the interface adapter 720, which may include, for example, a Super I/O chip integrating multiple device adapters into a single integrated circuit.

Thus, as configured in FIG. 8, the processing system 700 includes processing capability in the form of processors 701, and, storage capability including the system memory 703 and the mass storage 710, input means such as keyboard and mouse, and output capability including speaker and the display 715. In one embodiment, a portion of the system memory 703 and the mass storage 710 collectively store an operating system, such as the z/OS or AIX operating system from IBM Corporation, to coordinate the functions of the various components shown in FIG. 8.

Technical effects and benefits include simultaneous inbound multi-packet processing in a computer system.

Embodiments may include a system and/or a method at any possible technical detail level of integration. The system may include a computer readable storage medium (or media) having computer readable program instructions thereon for causing a processor to carry out aspects of the embodiments herein. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments herein.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments herein. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A system comprising:
   an input/output adapter operable to receive a plurality of packets in a single clock cycle; and a controller operatively connected to the input/output adapter, the controller operable to perform:

receiving a first packet on a first pipeline and a second packet on a second pipeline in a same clock cycle;

routing a header portion of the first packet and a header portion of the second packet on a header path to a header buffer comprising a plurality of physical arrays in parallel through a header buffer write interface comprising a multiple byte wide bus and a single offset address comprising multiple bytes with a write enable; and routing a payload portion of the first packet and a payload portion of the second packet on a data path to a data buffer comprising a plurality of physical arrays in parallel through a data buffer write interface having a single offset address.

2. The system of claim 1, wherein the input/output adapter is a peripheral component interconnect express (PCIe) adapter.

3. The system of claim 1, wherein the controller is operable to track validity on an array basis for the physical arrays of the header buffer and the physical arrays of the data buffer.

4. The system of claim 1, wherein the multiple byte wide bus comprises a 16 byte wide bus, and the single offset address is a 16 byte offset address with the write enable.

5. The system of claim 4, wherein the controller is operable to read from the header buffer through a header buffer read interface comprising a 16 byte wide read bus with a 16 byte address offset.

6. The system of claim 1, wherein the multiple byte wide bus comprises a 32 byte wide bus, and the single offset address is a 16 byte offset address with the write enable comprising a 2-bit write enable.

7. The system of claim 6, the controller is operable to read from the data buffer through a data buffer read interface comprising a 32 byte wide read bus with a 16 byte address offset.

8. The system of claim 7, wherein the controller is operable to wrap addresses targeting 16 byte wide or 32 byte wide reads through the data buffer read interface.

9. The system of claim 6, wherein each bit of the 2-bit write enable is associated with a 16 byte half of the 32 byte wide bus, and the controller assigns the 16 byte address offset per pipeline with gapless 16 byte offset assignments.

10. A method comprising:

receiving a first packet on a first pipeline and a second packet on a second pipeline in a same clock cycle at an input/output adapter operatively connected to a controller;

routing, by the controller, a header portion of the first packet and a header portion of the second packet on a header path to a header buffer comprising a plurality of physical arrays in parallel through a header buffer write interface comprising a multiple byte wide bus a single offset address comprising multiple bytes with a write enable; and routing, by the controller, a payload portion of the first packet and a payload portion of the second packet on a data path to a data buffer comprising a plurality of physical arrays in parallel through a data buffer write interface having a single offset address.

11. The method of claim 10, wherein the input/output adapter is a peripheral component interconnect express (PCIe) adapter.

12. The method of claim 10, further comprising tracking validity on an array basis for the physical arrays of the header buffer and the physical arrays of the data buffer.

13. The method of claim 10, wherein the multiple byte wide bus comprises a 16 byte wide bus, and the single offset address is a 16 byte offset address with the write enable.

14. The method of claim 13, further comprising reading from the header buffer through a header buffer read interface comprising a 16 byte wide read bus with a 16 byte address offset.

15. The method of claim 10, wherein the multiple byte wide bus comprises a 32 byte wide bus, and the single offset address is a 16 byte offset address with the write enable comprising a 2-bit write enable.

16. The method of claim 15, further comprising reading from the data buffer through a data buffer read interface comprising a 32 byte wide read bus with a 16 byte address offset.

17. The method of claim 16, further comprising wrapping addresses targeting 16 byte wide or 32 byte wide reads through the data buffer read interface.

18. The method of claim 15, wherein each bit of the 2-bit write enable is associated with a 16 byte half of the 32 byte wide bus, and further comprising assigning the 16 byte address offset per pipeline with gapless 16 byte offset assignments.

19. A computer program product comprising a computer readable storage medium having program instructions embodied therewith, the program instructions executable by a processing circuit of a controller to cause the processing circuit to perform:

receiving a first packet on a first pipeline and a second packet on a second pipeline in a same clock cycle at an input/output adapter operatively connected to the controller;

routing, by the controller, a header portion of the first packet and a header portion of the second packet on a header path to a header buffer comprising a plurality of physical arrays in parallel through a header buffer write interface comprising a multiple byte wide bus and a single offset address comprising multiple bytes with a write enable; and routing, by the controller, a payload portion of the first packet and a payload portion of the second packet on a data path to a data buffer comprising a plurality of physical arrays in parallel through a data buffer write interface having a single offset address.

20. The computer program product of claim 19, wherein the program instructions further cause the processing circuit to perform tracking validity on an array basis for the physical arrays of the header buffer and the physical arrays of the data buffer.

* * * * *